US008437087B2

(12) United States Patent
Tohara et al.

(10) Patent No.: US 8,437,087 B2
(45) Date of Patent: May 7, 2013

(54) OBSERVATION OPTICAL SYSTEM AND IMAGE DISPLAY APPARATUS (75) Inventors: Masakazu Tohara, Kawasaki (JP); Shoichi Yamazaki, Yokohama (JP); Kazutaka Inoguchi, Kawasaki (JP); Kenichi Saito, Yokohama (JP); Motomi Tsuyuki, Kawasaki (JP)

(73) Assignee: Canon Kabushiki Kaisha (JP)

( * ) Notice: Subject to any disclaimer, the term of this patent is extended or adjusted under 35 U.S.C. 154(b) by 409 days.

(21) Appl. No.: 12/782,373

(22) Filed: May 18, 2010

(65) Prior Publication Data
US 2010/0290125 A1    Nov. 18, 2010

(30) Foreign Application Priority Data

May 18, 2009    (JP) .................................. 2009-119690

(51) Int. Cl.
G02B 27/14    (2006.01)
G09G 5/00    (2006.01)
G02F 1/1335    (2006.01)
H04N 7/00    (2006.01)

(52) U.S. Cl.
USPC .................. 359/630; 345/7; 349/11; 348/115

(58) Field of Classification Search .......... 359/630–639, 359/404, 407, 409–410, 726; 345/7, 9; 348/115; 349/11; 451/28, 41; 353/11–12, 28, 119, 353/31, 34, 38; 340/438, 960, 995.1, 815.47, 340/815.74
See application file for complete search history.

(56) References Cited

U.S. PATENT DOCUMENTS

| 5,751,494 | A | 5/1998 | Takahashi | |
|---|---|---|---|---|
| 6,008,778 | A | 12/1999 | Takahashi et al. | |
| 6,330,114 | B1 * | 12/2001 | Park et al. | 359/636 |
| 6,644,813 | B1 * | 11/2003 | Bowron | 353/31 |
| 2003/0193650 | A1 * | 10/2003 | Sugawara | 353/31 |

FOREIGN PATENT DOCUMENTS

| JP | 7-274097 A | 10/1995 |
|---|---|---|
| JP | 9-166759 A | 6/1997 |
| JP | 09-236775 A | 9/1997 |
| JP | 10-246865 A | 9/1998 |
| JP | 11-326820 A | 11/1999 |
| JP | 3524569 B2 | 5/2004 |
| JP | 2009-003128 A | 1/2009 |

OTHER PUBLICATIONS

Tohara, Masakazu, "Image Display Apparatus," Specification and Drawings of unpublished related co-pending U.S. Appl. No. 12/782,353, pp. 1-88.
JP Office Action issued Jun. 19, 2012 for corresponding JP 2009-119690.

* cited by examiner

Primary Examiner — Dawayne A Pinkney
(74) Attorney, Agent, or Firm — Rossi, Kimms, & McDowell LLP (57) ABSTRACT The observation optical system introduces light from a first display element and light from a second display element to an exit pupil to present an enlarged combined image of first and second original images. The optical system includes a first optical element allowing the light from the first display element to enter thereinto, a second optical element allowing the light from the second display element to enter thereinto, and a third optical element. The optical system introduces a first light component from a first display area in the second display element to the exit pupil through the second optical element and at least the first optical element, and introduces a second light component from a second display area in the second display element to the exit pupil through the second and third optical elements, not through the first optical element.

6 Claims, 5 Drawing Sheets

OBSERVATION OPTICAL SYSTEM AND IMAGE DISPLAY APPARATUS

BACKGROUND OF THE INVENTION

1. Field of the Invention

The present invention relates to an observation optical system that combines light fluxes from plural display elements to present one enlarged combined image, in particular, relates to an observation optical system suitable for an image display apparatus such as a head-mounted display (HMD).

2. Description of the Related Art

For observation optical systems used for image display apparatuses such as HMDs, image presentation with a wide view angle is required to enable natural observation of images and to increase realistic sensation. Moreover, it is desirable that the observation optical system for the image display apparatus being mounted on an observer's head be small and thin.

Some of such small and thin observation optical systems capable of presenting images with a wide view angle use plural display elements displaying original images for mutually different view angles, and form one image by combining plural enlarged images corresponding to the original images to enable observation of an enlarged combined image. The use of the plural display elements enables reduction in size and thickness of an optical system for each of the plural display elements, which realizes a wholly small and thin observation optical system capable of presenting images with a wide view angle.

Such image display apparatuses have been disclosed in Japanese Patent Laid-Open Nos. 07-274097, 11-326820, 10-246865 and 09-166759 and Japanese Patent No. 3524569.

The observation optical systems disclosed in Japanese Patent Laid-Open Nos. 07-274097 and Japanese Patent No. 3524569 provide therein a V-shaped mirror symmetric with respect to a visual axis. In these observation optical systems, a light flux from an original image displayed on one display element is reflected at one reflective surface of the V-shaped mirror to be introduced to an exit pupil, and a light flux from an original image displayed on another display element is reflected at another reflective surface of the V-shaped mirror to be introduced to the exit pupil.

The observation optical system disclosed in Japanese Patent Laid-Open No. 11-326820 includes a prism formed into a shape symmetric with respect to a visual axis. A light flux from an original image displayed on one display element enters the prism through one entrance surface thereof facing the one display element, is reflected at a first surface which is a transmissive and internal total reflective surface of the prism, is reflected at another reflective surface, and then is transmitted through the first surface to be introduced to an exit pupil. Further, a light flux from an original image displayed on another display element enters the prism through another entrance surface thereof facing the other display element, is reflected at the first surface, is reflected at still another reflective surface, and then is transmitted through the first surface to be introduced to the exit pupil.

The observation optical system disclosed in Japanese Patent Laid-Open No. 10-246865 also includes a prism formed into a shape symmetric with respect to a visual axis. In this observation optical system, first and second entrance surfaces of the prism respectively facing first and second display elements are used also as reflective surfaces introducing light fluxes from the second and first display elements to an exit pupil.

The observation optical system disclosed in Japanese Patent Laid-Open No. 09-166759 includes prisms disposed on a visual axis at positions near and far from an exit pupil. The prism near the exit pupil reflects a light flux from an original image displayed on one display element twice to introduce it to the exit pupil, and the prism far from the exit pupil reflects a light flux from an original image displayed on another display element twice to introduce it to the exit pupil through the prism near the exit pupil.

However, each of the observation optical systems disclosed in Japanese Patent Laid-Open Nos. 07-274097, 11-326820 and 10-246865 and Japanese Patent No. 3524569 is not capable of overlapping the light fluxes from the respective original images with each other at a boundary part of the enlarged images mutually combined. Therefore, when an observer's eye is rotated, a joint line of the enlarged images becomes noticeable in the boundary part, which disturbs natural image observation.

Moreover, in the observation optical system disclosed in Japanese Patent Laid-Open No. 09-166759, since all the light flux from the prism far from the exit pupil is transmitted through the prism near the exit pupil, the prism far from the exit pupil is enlarged, which causes an increase in size of the entire observation optical system.

SUMMARY OF THE INVENTION

The present invention provides a small and thin observation optical system capable of presenting with a wide view angle an enlarged combined image formed by combining light fluxes from plural original images (display elements), and enabling natural image observation.

The present invention provides as an aspect thereof an observation optical system configured to introduce light from a first display element configured to display a first original image and light from a second display element configured to display a second original image to an exit pupil to present an enlarged combined image of the first and second original images. The observation optical system includes a first optical element configured to allow the light from the first display element to enter thereinto, a second optical element configured to allow the light from the second display element to enter thereinto, and a third optical element. The optical system is configured to introduce a first light component from a first display area in the second display element to the exit pupil through the second optical element and at least the first optical element of the first and third optical elements, and introduce a second light component from a second display area that is a different area from the first display area in the second display element to the exit pupil through the second and third optical elements, not through the first optical element.

The present invention provides as another aspect thereof an image display apparatus including first and second display elements and the above-described observation optical system.

Other aspects of the present invention will become apparent from the following description and the attached drawings.

DESCRIPTION OF THE PREFERRED EMBODIMENTS

Exemplary embodiments of the present invention will hereinafter be described with reference to the accompanying drawings.

[Embodiment 1]

Figure 1:
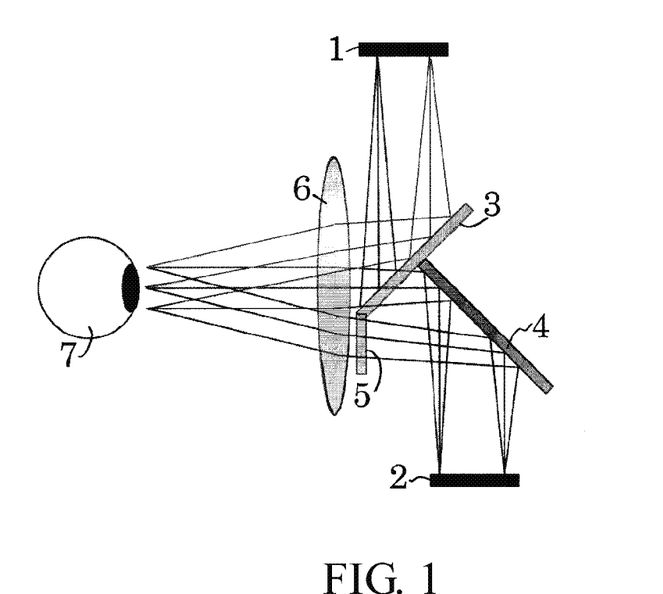
FIG. 1 shows a configuration of an observation optical system that is Embodiment 1 of the present invention.

FIG. 1 shows an observation optical system installed in an image display apparatus that is a first embodiment (Embodiment 1) of the present invention. Reference numeral 1 denotes a first display element, and reference numeral 2 denotes a second display element. Reference numeral 3 denotes a first optical element, and reference numeral 4 denotes a second optical element. Reference numeral 5 denotes a third optical element.

Reference numeral 6 denotes an ocular lens, and reference numeral 7 denotes an observer's eye. The eye 7 is placed at a position of an exit pupil of the observation optical system or in the vicinity thereof.

As the first and second display elements 1 and 2, a display device such as a light-emitting display element (an organic electroluminescence (EL) element, etc.) or an LCD (a transmissive liquid crystal panel, etc.) can be used.

Light from a first original image displayed on the first display element 1 impinges on and is reflected by the first optical element 3 constituted by a half-mirror to be introduced to the eye 7 (exit pupil) as light forming an upper view angle in FIG. 7 through the ocular lens 6.

Light from a second original image displayed on the second display element 2 impinges on and reflected by the second optical element 4. Of the reflected light, a first light component from a first display area (left area in the figure) in the second display element 2 is transmitted through the first optical element 3 to be introduced to the eye 7 (exit pupil) through the ocular lens 6. Further, of the reflected light, a second light component from a second display area (right area in the figure) which is a different area from the first display area in the second display element 2 is transmitted through the third optical element 5, but not through the first optical element 3, to be introduced to the eye 7 (exit pupil) through the ocular lens 6. The first and second light components from the second display element 2 are introduced to the eye 7 as light forming a lower view angle in the figure.

This configuration enables presentation of one image formed by combining an enlarged image corresponding to the first original image and an enlarged image corresponding to the second original image (that is, presentation of an enlarged combined image of the first and second original images) at the exit pupil.

Further, this configuration makes it possible to reduce a size and a thickness of the entire observation optical system as compared with a case where all the light from the second display element 2 is introduced to the eye 7 through the first optical element 3.

The third optical element 5 is an optical transparent member whose refractive index and thickness are the same as those of the first optical element 3. The third optical element 5 reduces (or eliminates) a difference between a length of an optical path of the first light component emerging from the second display element 2 and being transmitted through the first optical element 3 and a length of an optical path of the second light component emerging from the second display element 2 and being transmitted through the third optical element 5 but being not transmitted through the first optical element 3.

In order to introduce the light from the first display element 1 and the light from the second display element 2 to the eye 7 with an approximately same luminance, it is desirable that the third optical element 5 be formed as a half-mirror that light reflected thereby and light transmitted therethrough have intensities equal to each other.

There is a case where the first light component emerging from the second display element 2 and being transmitted through the first optical element and the second light component emerging from the second display element 2 and being transmitted through the third optical element 5 but being not transmitted through the first optical element 3 have a difference in luminance. In this case, it is desirable to provide on the optical path of the second light component (optical path from the second display area to the exit pupil) a light-amount reducing member such as a filter or a film which reduces an amount of the second light component. The light-amount reducing member may be provided on a surface of the third optical element 5. It is more desirable that the light-amount reducing member have a transmittance of 50%.

In addition, although FIG. 1 shows the configuration in which the first optical element 3 and the third optical element 5 are arranged adjacently to each other, these optical elements 3 and 5 may be formed integrally with each other. In this case, a luminance of an image in an area (light overlapping area) where the light from the first display element 1 and the light from the second display element 2 are overlapped with each other is twice as high as those in other areas. Therefore, it is desirable to reduce a luminance of each partial image area corresponding to the light overlapping area in the first and second original images displayed on the first and second display elements 1 and 2.

[Embodiment 2]

Figure 2:
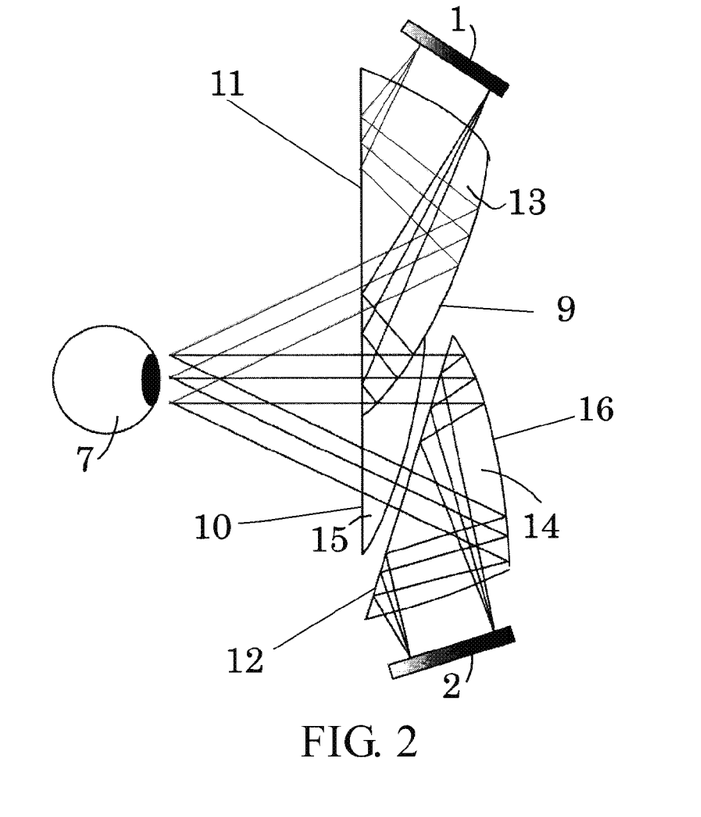
FIG. 2 shows a configuration of an observation optical system that is Embodiment 2 of the present invention.

FIG. 2 shows an observation optical system installed in an image display apparatus that is a second embodiment (Embodiment 2) of the present invention. Reference numeral 1 denotes a first display element, and reference numeral 2 denotes a second display element. Reference numeral 13 denotes a first optical element, and reference numeral 14 denotes a second optical element. Reference numeral 15 denotes a third optical element.

Reference numeral 7 denotes an observer's eye. The eye 7 is placed at a position of an exit pupil of the observation optical system or in the vicinity thereof.

As the first and second display elements 1 and 2, a same display device as that used in Embodiment 1 is used.

In this embodiment, optical paths are folded by plural decentered reflective curved surfaces provided to each of the first optical element 13 and the second optical element 14, which reduces a thickness of the observation optical system further than that in Embodiment 1. Moreover, the third optical element 15 is disposed between the first optical element 13 and the second optical element 14. Each of the first to third optical elements 13, 14 and 15 is formed of a transparent member (prism element) whose inside is filled with an optical medium such as glass or plastic having a refractive index larger than 1.

Light from a first original image displayed on the first display element 1 is reflected once by a surface 11 of the first optical element 13, further reflected by an optical surface 9 which is a half-mirror surface, and then transmitted through the surface 11 to be introduced to the eye 7 (exit pupil) as light forming an upper view angle in FIG. 2.

Light from a second original image displayed on the second display element 2 is reflected twice by surfaces 12 and 16 of the second optical element 14, and then transmitted through the third optical element 15. Of the light transmitted through the third optical element 15, a first light component from a first display area (right area in the figure) of the second display element 2 is transmitted through the first optical element 13 to be introduced to the eye 7 (exit pupil). The first light component from the first display area is transmitted through the optical surface 9 of the first optical element 13.

Of the light transmitted through the third optical element 15, a second light component from a second display area (left area in the figure) of the second display element 2 is transmitted through a surface 10 of the third optical element 15, but not transmitted through the first optical element 13, to be introduced to the eye 7 (exit pupil). The first and second light components from the second display element 2 are introduced to the eye 7 as light forming a lower view angle in the figure.

This configuration enables presentation of one image formed by combining an enlarged image corresponding to the first original image and an enlarged image corresponding to the second original image (that is, presentation of an enlarged combined image of the first and second original images) at the exit pupil.

Further, this configuration makes it possible to reduce the thickness of the entire observation optical system because the light from the second display element 2 includes the first light component being transmitted through the first optical element 13 and the second light component being not transmitted through the first optical element 13, as well as in Embodiment 1.

Figure 6A:
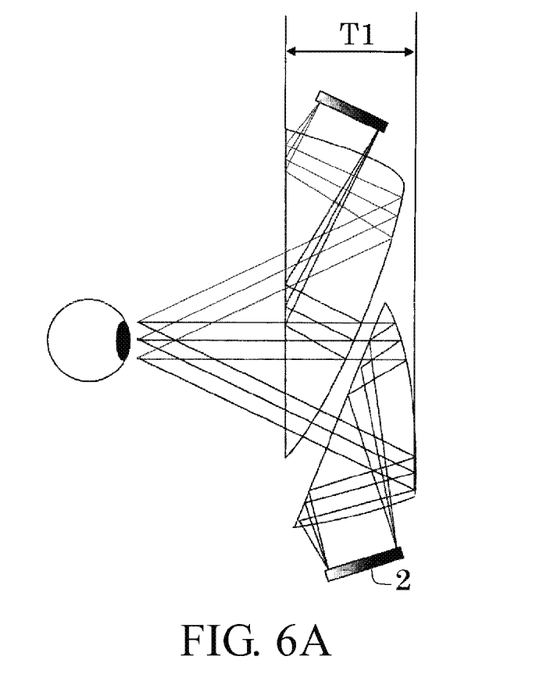
FIG. 6 shows that a thickness of the observation optical system of Embodiment 2 is reduced.
Figure 6B:
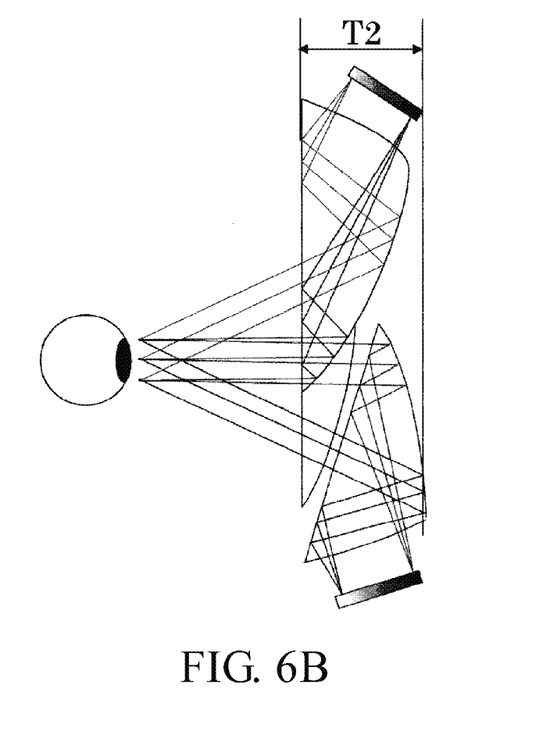

FIG. 6A shows a thickness T1 of an observation optical system configured such that all light from the second display element 2 is introduced to the exit pupil through the first optical element. FIG. 6B shows a thickness T2 of the observation optical system in this embodiment. As understood from these figures, T2 is smaller than T1, that is, this embodiment enables reduction in thickness of the entire observation optical system.

Moreover, in this embodiment, the third optical element 15 is disposed between the first optical element 13 and the second optical element 14, and the first optical element 13 is cemented to the third optical element 15. This configuration can reduce discontinuity of an enlarged image formed by the first light component emerging from the second display element 2 and being transmitted through the first optical element 13 and an enlarged image formed by the second light component emerging from the second display element 2 and being not transmitted through the first optical element 13. This makes it possible to reduce or eliminate unnaturalness of the enlarged image corresponding to the second original image.

In addition, in this embodiment, the number of optical surfaces constituting the observation optical system is larger than that of Embodiment 1, which is advantageous to aberration correction.

Also in this embodiment, in order to introduce the light from the first display element 1 and the light from the second display element 2 to eye 7 with an approximately same luminance, it is desirable that the optical surface 9 be formed as a half-mirror that light reflected thereby and light transmitted therethrough have intensities equal to each other.

Further, if there is a difference in luminance between the first light component emerging from the second display element 2 and being transmitted through the first optical element 13 and the second light component emerging from the second display element 2 and being not transmitted through the first optical element 13, it is desirable to provide on the optical path of the second light component (for example, on the surface 10 of the third optical element 15) a light-amount reducing member such as a filter or a film which reduces an amount of the second light component. It is more desirable that the light-amount reducing member have a transmittance of 50%.

Furthermore, as well as in Embodiment 1, a luminance of an image in an area (light overlapping area) where the light from the first display element 1 and the light from the second display element 2 are overlapped with each other is twice as high as those in other areas. Therefore, it is desirable to reduce a luminance of each partial image area corresponding to the light overlapping area in the first and second original images displayed on the first and second display elements 1 and 2.

In addition, it is desirable that the reflection at the surface 11 of the first optical element 13 and the reflection at the surface 12 of the second optical element 14 be internal total reflection. Such internal total reflection reduces a light amount loss to enable presentation of a bright image.

Forming all the surfaces of the first to third optical elements 13, 14 and 15 as curved surfaces causes these surfaces to contribute to condensing of light, diverging of light or aberration correction, which enables elimination of an unnecessary surface in the observation optical system to reduce cost.

Further, forming all the surfaces of the first to third optical elements 13, 14 and 15 as surfaces having a non-rotationally symmetric shape (non-rotationally symmetric surfaces) increases a degree of freedom of decentering aberration correction to enable presentation of an enlarged combined image having an excellent image quality.

In this case, forming each non-rotationally symmetric surface into a plane symmetric shape in a direction of a local sagittal cross-section with respect to a local meridional cross-section as a unique symmetry plane preferably makes it possible to facilitate forming and producing of the non-rotationally symmetric surface, as compared with a case of not forming it into such a plane symmetric shape. The local meridional cross-section and the local sagittal cross-section will be described later.

As described above, the observation optical system of each of Embodiments 1 and 2 can present the enlarged combined image of the first and second original images displayed on the first and second display elements 1 and 2 with an excellent image quality.

Numerical examples corresponding to above-described Embodiments 1 and 2 will hereinafter be described.

First, description will be made of definitions of a meridional cross-section, a sagittal cross-section, the local meridional cross-section and the local sagittal cross-section. In definitions in a conventional system which does not correspond to a decentering system, when defining a z-axis of a surface apex coordinate system as an optical axis, a y-z cross-section corresponds to a conventional meridional cross-section and an x-z cross-section corresponds to a conventional sagittal cross-section. Since the observation optical systems of the above-described embodiments are decentering optical systems, the local meridional cross-section and the local sagittal cross-section for the decentering system are newly defined as follows. The local meridional cross-section is defined as a plane (cross-section) including a hit point(s) of a central view angle principal ray (that is, a light ray emerging from a center of the original image displayed on the display element and then reaching a center of the exit pupil of the observation optical system) at each surface and further including an entering ray portion and an exiting ray portion of the central view angle principal ray. The local sagittal cross-section is defined as a plane (cross-section) including the hit point(s), being orthogonal to the local meridional cross-section and being parallel to the conventional (normal) sagittal cross-section in the surface apex coordinate system.

Numerical Example 1

Figure 3:
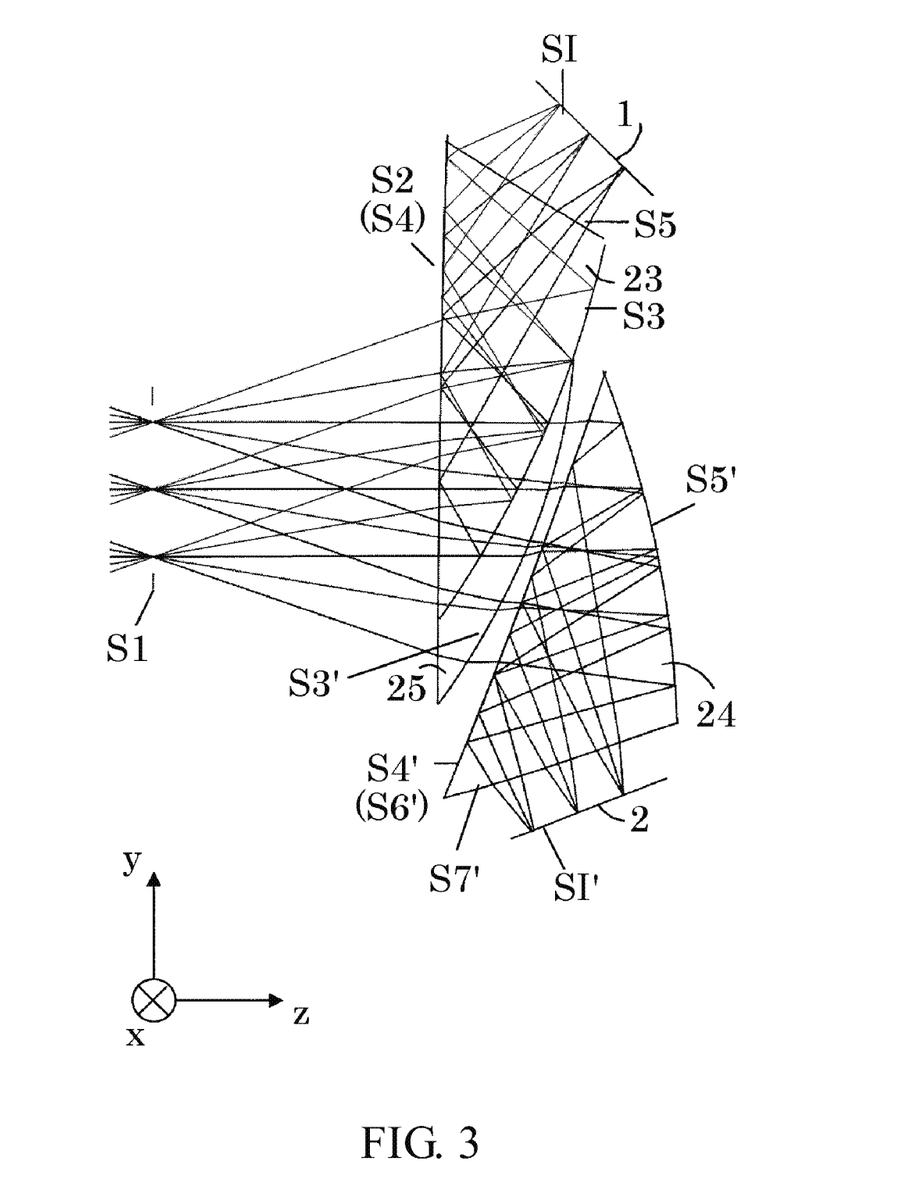
FIG. 3 is an optical cross-sectional view of Numerical Example 1 of the present invention.

FIG. 3 shows an optical cross-section of Numerical Example 1 corresponding to Embodiment 2 shown in FIG. 2. As described in Embodiment 2, in this numerical example, the first and second original images are combined in an upper and lower direction. In this numerical example and another numerical example described later, description is made by reverse ray tracing from the exit pupil toward the display elements regarded as image planes.

Each of the first to third optical elements 23, 24 and 25 is formed as a transparent member (prism element) having three surfaces. The first optical element 23 and the third optical element 25 are cemented to each other at a surface S3. A surface S2 and a surface S4 are formed as a same surface, and a surface S4' and a surface S6' are formed as a same surface. A surface SI and a surface SI' are display surfaces of the first and second display elements 1 and 2. Reference symbol S1 denotes the exit pupil.

As described in Embodiment 2, in order to equalize the amounts of light in the respective view angles, the surface S3 of the first optical element 23 is formed as a half-mirror surface that reflects light from the first display element 1 and transmits light from the second display element 2. The surface S2 of the third optical element 25 is provided with a light-amount reducing member whose transmittance is 50%.

Light from a first original image displayed on the first display element 1 enters the first optical element 23 through a surface S5, is reflected at the surface S4 and the surface S3, and then exits the first optical element 23 through the surface S2 to be introduced to the exit pupil S1.

Light from a second original image displayed on the second display element 2 enters the second optical element 24 through a surface S7', is reflected at the surface S6' and a surface S5', and then exits the second optical element 24 through the surface S4' to enter the third optical element 25 through a surface S3'. Of the light that has entered the third optical element 25 from the surface S3', a first light component from a first display area of the second display element 2 enters the first optical element 23 through the cemented surface S3, and then exits the first optical element 23 through the surface S2 to be introduced to the exit pupil S1. A second light component from a second display area of the second display element 2 exits the third optical element 25 through the surface S2 without entering the first optical element 23, and then is introduced to the exit pupil S1.

It is desirable that the reflection at the surface S4 of the first optical element 23 and the reflection at the surface S6' of the second optical element 24 be internal total reflection. Such internal total reflection reduces a light amount loss in these reflections.

Table 1 shows optical data of this numerical example when the surfaces S2 to S5 and S3' to S7' are non-rotationally symmetric surfaces whose unique symmetry plane is a paper (y-z cross-section) of FIG. 3.

In the optical data, a most left item "SURF" represents a surface number. "X", "Y" and "Z" represent positions of an apex of each surface on an x-axis, a y-axis and the z-axis in a coordinate system in which a center of the surface S1 is defined as an origin (0, 0, 0). The x-axis, the y-axis and the z-axis are defined as shown in FIG. 3, the x-axis extending in a perpendicular direction to the paper of FIG. 3. "A" represents a tilt angle (degree) around the x-axis when a counter-clockwise direction in FIG. 3 is defined as a positive direction.

"Rx" represents a curvature radius in a direction of the x-axis, and "Ry" represents a curvature radius in a direction of the y-axis. "TYP" represents a type of a surface shape, and "FFS1" shows that the surface is a non-rotationally symmetric surface according to the following expression (1), and "FFS2" shows that the surface is a non-rotationally symmetric surface according to the following expression (2).

FFS1: Expression (1)

$$z = (1/R)*(x^2 + y^2) / \left(1 + (1 - (1+c1)*(1/R)^2*(x^2+y^2))^{(1/2)}\right) + c2 + \\ c4*y + c5*(x^2 - y^2) + c6*(-1 + 2*x^2 + 2*y^2) + \\ c10*(-2*y + 3*x^2*y + 3*y^3) + \\ c11*(3*x^2*y - y^3) + c12*(x^4 - 6*x^2*y^2 + y^4) + \\ c13*(-3*x^2 + 4*x^4 + 3*y^2 - 4*y^4) + c14* \\ (1 - 6*x^2 + 6*x^4 - 6*y^2 + 12*x^2*y^2 + 6*y^4) + \\ c20*(3*y - 12*x^2*y + 10*x^4*y - 12*y^3 + \\ 20*x^2*y^3 + 10*y^5) + c21*(-12*x^2*y + \\ 15*x^4*y + 4*y^3 + 10*x^2*y^3 - 5*y^5) + \\ c22*(5*x^4*y - 10*x^2*y^3 + y^5) + \\ c23*(x^6 - 15*x^4*y^2 + 15*x^2*y^4 - y^6) + \\ c24*(-5*x^4 + 6*x^6 + 30*x^2*y^2 - \\ 30*x^4*y^2 - 5*y^4 - 30*x^2*y^4 + 6*y^6) + \\ c25*(6*x^2 - 20*x^4 + 15*x^6 - 6*y^2 + \\ 15*x^4*y^2 + 20*y^4 - 15*x^2*y^4 - 15*y^6) + \\ c26*(-1 + 12*x^2 - 30*x^4 + 20*x^6 + \\ 12*y^2 - 60*x^2*y^2 + 60*x^4*y^2 - \\ 30*y^4 + 60*x^2*y^4 + 20*y^6) + \ldots$$

FFS2: Expression (2)

$$z = ((1/Rx)*x^2 + (1/Ry)*y^2) / \left(1 + (1 - (1+cx1)*(1/Rx)^2*x^2 - (1+cy1)*(1/Ry)^2*y^2)^{(1/2)}\right) + c2 + c4*y + \\ c5*(x^2 - y^2) + c6*(-1 + 2*x^2 + 2*y^2) + \\ c10*(-2*y + 3*x^2*y + 3*y^3) + \\ c11*(3*x^2*y - y^3) + c12*(x^4 - 6*x^2*y^2 + y^4) + \\ c13*(-3*x^2 + 4*x^4 + 3*y^2 - 4*y^4) + \\ c14*(1 - 6*x^2 + 6*x^4 - 6*y^2 + 12*x^2*y^2 + \\ 6*y^4) + c20*(3*y - 12*x^2*y + \\ 10*x^4*y - 12*y^3 + 20*x^2*y^3 + 10*y^5) + \\ c21*(-12*x^2*y + 15*x^4*y + 4*y^3 + \\ 10*x^2*y^3 - 5*y^5) + \\ c22*(5*x^4*y - 10*x^2*y^3 + y^5) + \\ c23*(x^6 - 15*x^4*y^2 + 15*x^2*y^4 - y^6) + \\ c24*(-5*x^4 + 6*x^6 + 30*x^2*y^2 - \\ 30*x^4*y^2 - 5*y^4 - 30*x^2*y^4 + 6*y^6) + \\ c25*(6*x^2 - 20*x^4 + 15*x^6 - 6*y^2 + \\ 15*x^4*y^2 + 20*y^4 - 15*x^2*y^4 - 15*y^6) + \\ c26*(-1 + 12*x^2 - 30*x^4 + 20*x^6 + \\ 12*y^2 - 60*x^2*y^2 + 60*x^4*y^2 - \\ 30*y^4 + 60*x^2*y^4 + 20*y^6) + \ldots$$

A numerical value written next to "FFS1" or "FFS2" in the column of "TYP" shows that the surface shape is a non-rotationally symmetric shape corresponding to an aspheric coefficient $c_i$ written in the lower part of the table. "Nd" and "vd" respectively represent a refractive index and an Abbe constant for a d-line of a medium subsequent to the surface. A change in sign of the refractive index Nd shows that light is reflected at the surface. When the medium is air, only the refractive index Nd is written as 1.000. "E±M" means "$\times 10^{\pm M}$".

TABLE 1

| SURF | X | Y | Z | A |
|---|---|---|---|---|
| 1 | 0.000 | 0.000 | 0.000 | 0.000 |
| 2 | 0.000 | −27.919 | 20.000 | 0.275 |
| 3 | 0.000 | −22.306 | 8.661 | −47.775 |
| 4 | 0.000 | −27.919 | 20.000 | 0.275 |
| 5 | 0.000 | 20.623 | 26.896 | 57.723 |
| I | 0.000 | 26.464 | 29.419 | 45.698 |
| 3' | 0.000 | −27.950 | 7.063 | −55.671 |
| 4' | 0.000 | −21.692 | 20.540 | −22.253 |
| 5' | 0.000 | 6.930 | 32.230 | 20.159 |
| 6' | 0.000 | −21.692 | 20.540 | −22.253 |
| 7' | 0.000 | −19.358 | 28.686 | −71.107 |
| I' | 0.000 | −22.894 | 29.673 | −68.865 |

| SURF | Rx | Ry | TYP | Nd | vd |
|---|---|---|---|---|---|
| 1 | | | | | |
| 2 | 1310 | 1310 | FFS1-1 | 1.5709 | 33.8 |
| 3 | −58.43 | −80.51 | FFS2-2 | −1.5709 | 33.8 |
| 4 | 1310 | 1310 | FFS1-1 | 1.5709 | 33.8 |
| 5 | −34.86 | −646.0 | FFS2-3 | 1.0000 | |
| I | | | | | |
| 3' | −48.83 | −48.82 | FFS2-4 | 1.0000 | |
| 4' | −614.8 | −614.8 | FFS1-5 | 1.5709 | 33.8 |
| 5' | −68.57 | −78.06 | FFS2-6 | −1.5709 | 33.8 |
| 6' | −614.8 | −614.8 | FFS1-5 | 1.5709 | 33.8 |
| 7' | −24.12 | −74.81 | FFS2-7 | 1.0000 | |
| I' | | | | | |

FFS1-1 c 1: −1.6072e+003   c 5: 1.2911e−004
c 6: 1.0450e−004   c10: 6.8738e−008   c11: 8.1945e−007
c12: −3.3135e−009   c13: −9.1303e−010   c14: −1.1523e−009
c20: −1.0754e−011   c21: −4.4678e−011   c22: 8.9558e−011
c23: −4.5454e−012   c24: 1.1801e−012   c25: −1.0965e−013
c26: −1.7406e−013

FFS2-2 cx 1: −5.0067e−001   cy 1: 5.4643e−002
c 5: −2.2107e−004   c 6: −2.2667e−004   c10: −7.5746e−007
c11: −1.6442e−006   c12: 1.2177e−008   c13: 2.7833e−009
c14: −1.3709e−009   c20: −9.1838e−012   c21: 5.8068e−011
c22: 4.4163e−011   c23: 1.5326e−012   c24: −1.0868e−012
c25: 3.9577e−013   c26: 7.9185e−015

FFS2-3 cx 1: −4.6807e+000   cy 1: 6.1769e+002
c 5: −3.5424e−003   c 6: −5.7313e−004   c10: −3.2335e−006
c11: 9.3110e−005   c12: −1.4743e−006   c13: 1.6000e−006
c14: 1.1402e−006   c20: −1.4455e−007   c21: −1.2287e−007
c22: −4.9476e−007   c23: −1.7099e−008   c24: 5.5496e−009
c25: 5.3428e−009   c26: 3.5017e−009

FFS2-4 cx 1: −5.0067e−001   cy 1: 5.4643e−002
c 5: −2.2107e−004   c 6: −2.2667e−004   c10: 1.6305e−005
c11: −2.5414e−006   c12: 1.2177e−008   c13: 2.7833e−009
c14: −1.3709e−009   c20: −4.8734e−010   c21: −4.2932e−010
c22: 1.3825e−009   c23: −2.0236e−011   c24: −1.0868e−012
c25: 3.9577e−013   c26: 7.9185e−015

FFS1-5 c 1: −1.5135e+001   c 5: 2.0899e−005
c 6: −1.6000e−005   c10: 1.3212e−007   c11: 5.1321e−007
c12: −2.1383e−008   c13: −7.4011e−009   c14: 7.2614e−010
c20: 2.1701e−011   c21: −2.0697e−010   c22: −9.3903e−010
c23: 2.5658e−011   c24: 2.1476e−012   c25: −2.2187e−012
c26: −1.7320e−013

FFS2-6 cx 1: −4.3863e−001   cy 1: 5.4179e−001
c 5: −9.4479e−005   c 6: −7.8025e−005   c10: 7.0458e−007

TABLE 1-continued c11: 6.4470e−007   c12: −9.1055e−009   c13: −2.8171e−009
c14: −2.7106e−009   c20: −5.8316e−011   c21: 9.3022e−011
c22: 6.7366e−010   c23: 6.3149e−011   c24: 1.1174e−011
c25: 1.0475e−011   c26: 6.2739e−012

FFS2-7 cx 1: −8.1495e−001   cy 1: −4.9826e+001
c 5: −4.7651e−003   c 6: −5.1509e−004   c10: 1.9672e−005
c11: −4.8811e−005   c12: 6.7100e−008   c13: 2.0749e−006
c14: 1.3524e−006   c20: 1.5466e−007   c21: 1.1843e−007
c22: −3.1718e−008   c23: 1.3222e−009   c24: 1.6312e−008
c25: 1.7659e−008   c26: 9.3199e−009

In this numerical example, a display area of each of the first and second display elements 1 and 2 has a diagonal size of about 0.58 inches (7.2 mm×12.8 mm). The observation optical system of this numerical example has an exit pupil diameter Φ of 12 mm, and displays an enlarged combined image at an infinitely far position in a positive direction on the z-axis with a horizontal view angle of 50 degrees and a vertical view angle of 38 degrees. In this numerical example, since the entire vertical view angle is displayed in a divided manner by the two display elements 1 and 2, each of the display elements 1 and 2 displays the original image corresponding to a 19-degree vertical view angle. On the other hand, the 50-degree horizontal view angle is displayed by each of the display elements 1 and 2 because the horizontal view angle is not divided.

Figure 4A:
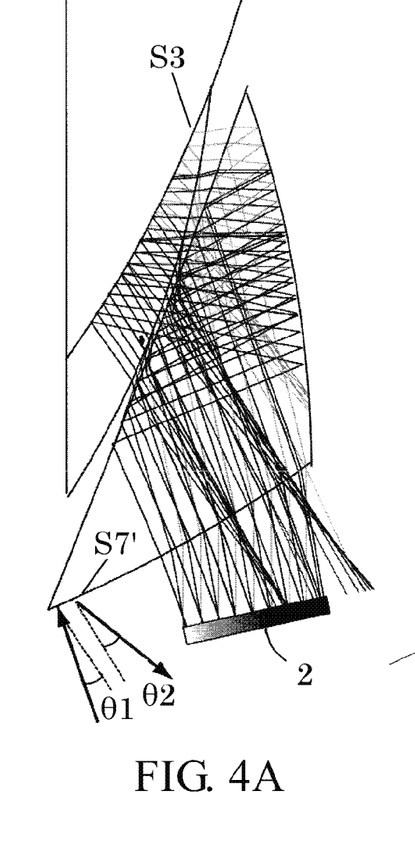
FIG. 4 is an explanatory drawing relating to removal of unnecessary light in Numerical Example 1.
Figure 4B:
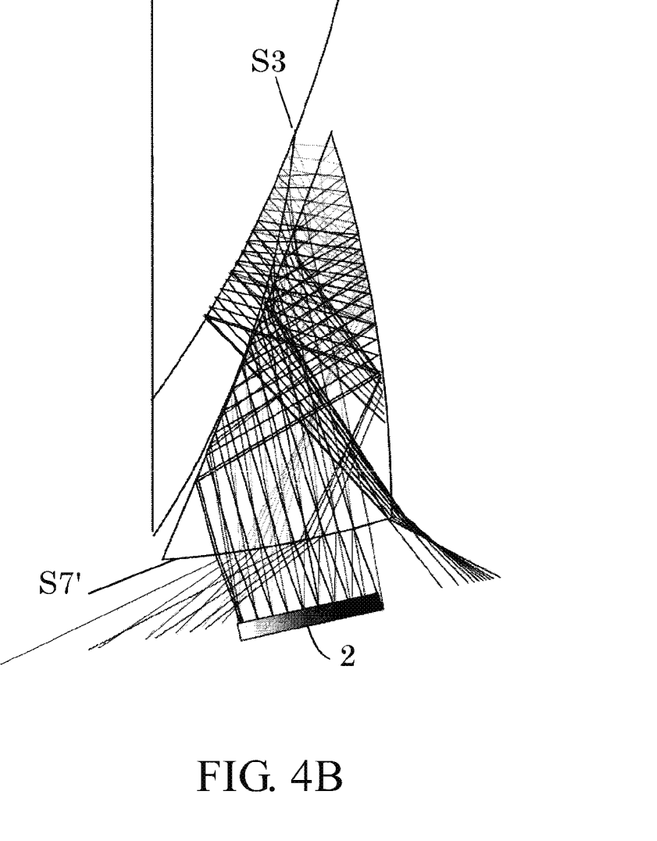

FIGS. 4A and 4B show cases where the light from the second display element 2 is reflected by the surface (cemented surface) S3 in the observation optical system. An incident angle of the light from the second display element 2 on the surface S7' which is an entrance surface of the second optical element 24 is defined as θ1, and an emergent angle from the entrance surface S7' of the light reflected by the cemented surface S3 of the first and third optical elements 23 and 25 is defined as θ2.

In the observation optical system shown in FIG. 4A, since a value of |θ1−θ2| is small, the light from the second display element 2 is reflected by the cemented surface S3 to be returned to the second display element 2. This causes an observer to observe not only an enlarged image corresponding to the second original image displayed on the second display element 2 but also unnecessary flare or ghost.

However, the observation optical system of Numerical Example 1 satisfies the following condition by changing a decentering angle of the surface S7' from that shown in FIG. 4A as shown in FIG. 4B:

|θ1−θ2|>20°.

The satisfaction of the above condition prevents the light from the second display element 2 which is reflected by the surface S3 and exits the surface S7' from returning to the second display element 2, which eliminates observation of the unnecessary flare or ghost.

Numerical Example 2

Figure 5:
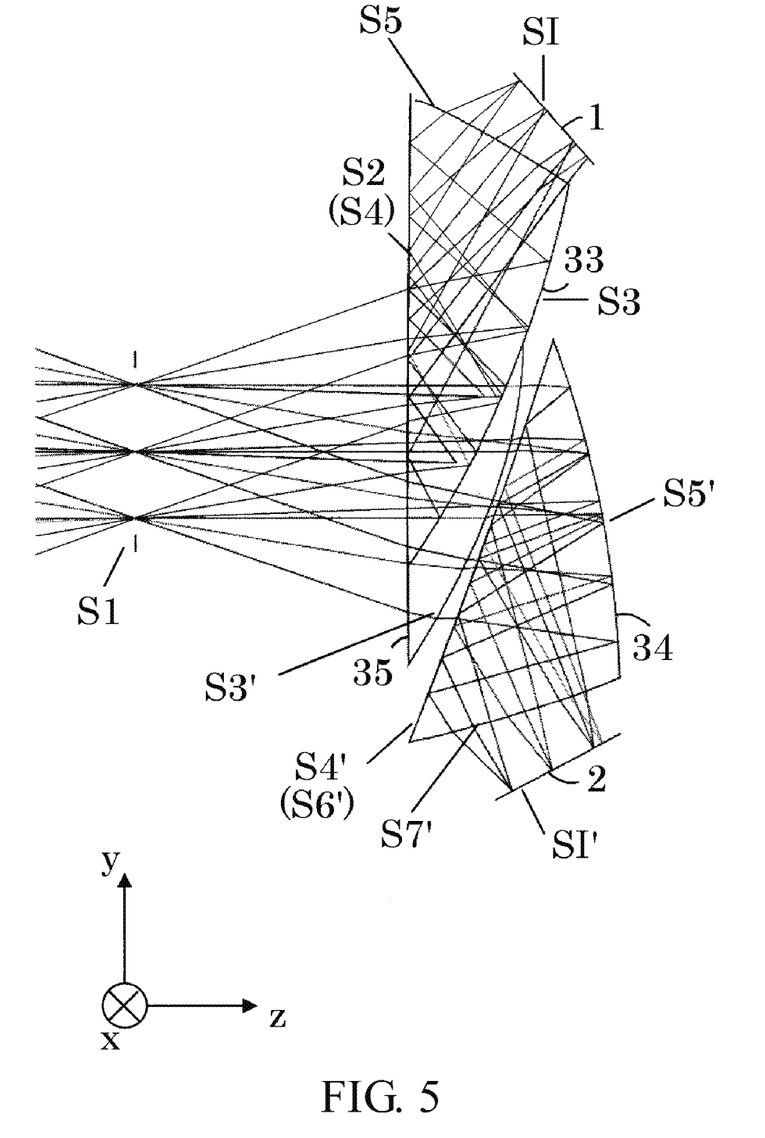
FIG. 5 is an optical cross-sectional view of Numerical Example 2 of the present invention.

FIG. 5 shows an optical cross-section of Numerical Example 2 corresponding to Embodiment 2 shown in FIG. 2. In this numerical example, the first and second original images are combined in an upper and lower direction as well as in Numerical Example 1.

Each of the first to third optical elements 33, 34 and 35 is formed as a transparent member (prism element) having three surfaces. The first optical element 33 and the third optical element 35 are cemented to each other at a surface S3. A surface S2 and a surface S4 are formed as a same surface, and a surface S4' and a surface S6' are formed as a same surface. A surface SI and a surface SI' are display surfaces of the first and second display elements 1 and 2. Reference symbol S1 denotes the exit pupil.

As described in Embodiment 2, in order to equalize the amounts of light in the respective view angles, the surface S3 of the first optical element 33 is formed as a half-mirror surface that reflects light from the first display element 1 and transmits light from the second display element 2. The surface S2 of the third optical element 35 is provided with a light-amount reducing member whose transmittance is 50%. Optical paths and optical actions of this numerical example are same as those of Numerical Example 1, and therefore descriptions thereof are omitted.

It is desirable that the reflection at the surface S4 of the first optical element 33 and the reflection at the surface S6' of the second optical element 34 be internal total reflection. Such internal total reflection reduces a light amount loss in these reflections.

This numerical example provides to original images being mutually combined (that is, enlarged images corresponding to the original images) overlapping areas each corresponding to a view angle of 2 degrees. Provision of such overlapping areas to the enlarged images being mutually combined enables adjustment of a gap at a boundary part of the enlarged images by changing a size of the overlapping area, the gap being caused due to a manufacturing error of the prism element or a positional displacement between the display element and the prism element. Therefore, even though manufacturing accuracy of the observation optical system and the image display apparatus is low, this numerical example can present a natural enlarged combined image in which a joint line in the boundary part of the enlarged images is not noticeable.

Excessively enlarging the size of the overlapping area increases a size of the observation optical system and makes aberration correction difficult. Thus, it is desirable that the size of the overlapping area be small. Further, an area of the enlarged combined image corresponding to the overlapping area has a luminance twice as high as those of other areas. Therefore, it is desirable to reduce a luminance of the overlapping area of each original image displayed on each display element.

Table 2 shows optical data of this numerical example when the surfaces S2 to S5 and S3' to S7' are non-rotationally symmetric surfaces whose unique symmetry plane is a paper (y-z cross-section) of FIG. 5.

TABLE 2

| SURF | X | Y | Z | A |
|---|---|---|---|---|
| 1 | 0.000 | 0.000 | 0.000 | 0.000 |
| 2 | 0.000 | 47.741 | 20.000 | −0.510 |
| 3 | 0.000 | −22.652 | 6.766 | −49.356 |
| 4 | 0.000 | 47.741 | 20.000 | −0.510 |
| 5 | 0.000 | 21.405 | 27.938 | 59.420 |
| I | 0.000 | 25.464 | 28.912 | 41.078 |
| 3' | 0.000 | −29.672 | 6.999 | −51.616 |
| 4' | 0.000 | −22.321 | 19.215 | −21.766 |
| 5' | 0.000 | 7.891 | 30.255 | 20.308 |
| 6' | 0.000 | −22.321 | 19.215 | −21.766 |

TABLE 2-continued

| | | | | | |
|---|---|---|---|---|---|
| 7' | 0.000 | −18.400 | 29.431 | −71.354 | |
| I' | 0.000 | −23.636 | 28.817 | −61.797 | |

| SURF | Rx | Ry | TYP | Nd | vd |
|---|---|---|---|---|---|
| 1 | | | | | |
| 2 | 4.855e−8 | 4.855e−8 | FFS1-1 | 1.5709 | 33.8 |
| 3 | −58.18 | −78.02 | FFS2-2 | −1.5709 | 33.8 |
| 4 | 4.855e−8 | 4.855e−8 | FFS1-1 | 1.5709 | 33.8 |
| 5 | −37.86 | −76.63 | FFS2-3 | 1.0000 | |
| I | | | | | |
| 3' | −54.18 | −47.20 | FFS2-4 | 1.0000 | |
| 4' | 652.3 | −652.3 | FFS1-5 | 1.5709 | 33.8 |
| 5' | −68.80 | −77.90 | FFS2-6 | −1.5709 | 33.8 |
| 6' | −652.3 | −652.3 | FFS1-5 | 1.5709 | 33.8 |
| 7' | −42.54 | −66.88 | FFS2-7 | 1.0000 | |
| I' | | | | | |

FFS1-1 c 1: −3.8632e+004  c 5: 9.8936e−005
c 6: 6.7270e−006  c10: −8.7328e−008  c11: −9.8172e−007
c12: −1.0934e−008  c13: −3.9013e−009  c14: 1.1774e−009
c20: −4.0889e−012  c21: 3.4930e−011  c22: 2.5488e−010
c23: 5.5199e−012  c24: 6.1278e−013  c25: −3.5315e−013
c26: 9.9712e−014

FFS2-2 cx 1: −7.5180e−001  cy 1 4: 8.3077e−002
c 5: −1.5202e−004  c 6: −1.4030e−004  c10: −1.5728e−006
c11: −1.7149e−006  c12: 2.0762e−008  c13: 9.7694e−009
c14: −4.7706e−009  c20: −5.4497e−011  c21: 1.1546e−010
c22: 2.7749e−010  c23: −3.3384e−012  c24: −1.8585e−012
c25: 8.9223e−013  c26: −2.6149e−013

FFS2-3 cx 1: −4.4941e+000  cy 1 4: 7.6181e+001
c 5: −3.4537e−003  c 6: −6.4701e−004  c10: 2.5594e−005
c11: 2.9559e−005  c12: −1.1825e−006  c13: −1.1886e−007
c14: 8.0994e−007  c20: 3.6017e−008  c21: −2.8198e−008
c22: −5.1463e−007  c23: −2.0316e−008  c24: 3.8124e−009
c25: 3.7861e−009  c26: 2.5645e−009

FFS2-4 cx 1: −7.5180e−001  cy 1: 8.3077e−002
c 5: −1.5202e−004  c 6: −1.4030e−004  c10: 3.6096e−005
c11: 7.5573e−006  c12: 2.0762e−008  c13: 9.7694e−009
c14: −4.7706e−009  c20: 2.2601e−010  c21: 3.7002e−010
c22: 1.1130e−009  c23: −5.1862e−011  c24: −1.8585e−012
c25: 8.9223e−013  c26: −2.6149e−013

FFS1-5 c 1: 5.5970e+001  c 5: 1.5402e−004
c 6: 1.6787e−006  c10: −7.1209e−006  c11: 1.1183e−006
c12: −2.5534e−008  c13: −5.0523e−009  c14: −3.6832e−010
c20: −2.2807e−013  c21: −1.4790e−010  c22: −8.4666e−010
c23: 3.7664e−011  c24: 1.0226e−012  c25: −1.2603e−012
c26: −4.9234e−013

FFS2-6 cx 1: −1.0380e+000  cy 1: 6.1739e−001
c 5: −8.2491e−005  c 6: −8.6735e−005  c10: 7.3831e−007
c11: 3.0047e−007  c12: −1.7596e−009  c13: 1.1976e−008
c14: 1.0588e−008  c20: −4.8560e−010  c21: −2.9775e−010
c22: 1.1537e−009  c23: 1.4570e−010  c24: −6.1971e−012
c25: 6.2147e−012  c26: 1.8085e−011

FFS2-7 cx 1: −2.9070e+000  cy 1: 3.7648e+001
c 5: −4.0145e−003  c 6: −1.1541e−003  c10: 1.7462e−005
c11: −4.4927e−005  c12: 3.3404e−007  c13: −1.6126e−007
c14: 1.7055e−007  c20: 2.2283e−008  c21: 2.4062e−008
c22: 6.3459e−009  c23: 4.4746e−009  c24: 4.4012e−009
c25: 5.4961e−009  c26: 1.8224e−009

In this numerical example, a display area of each of the first and second display elements 1 and 2 has a diagonal size of about 0.6 inches (7.2 mm×14 mm). The observation optical system of this numerical example has an exit pupil diameter Φ of 12 mm, and displays the enlarged combined image at an infinitely far position in a positive direction on the z-axis with a horizontal view angle of 50 degrees and a vertical view angle of 38 degrees. In this numerical example, since the entire vertical view angle is displayed in a divided manner by the two display elements 1 and 2 each displaying the original image including the overlapping area of the 2-degree view angle, each of the display elements 1 and 2 displays the original image corresponding to a 21-degree vertical view angle. On the other hand, the 50-degree horizontal view angle is displayed by each of the display elements 1 and 2 because the horizontal view angle is not divided.

As described above, each of Embodiments 1 and 2 provides to the light from the second display element the light (first light component) being transmitted through the first optical element and the light (second light component) being not transmitted through the first optical element, which reduces the size of the first optical element, thereby achieving reduction in size and thickness of the observation optical system. Further, each of Embodiments 1 and 2 includes the third optical element to make the optical path length of the first light component being transmitted through the first optical element and the optical path length of the second light component being not transmitted through the first optical element approximately equal to each other. The provision of the third optical element enables reduction of discontinuity of the enlarged image formed by the first and second light components. Furthermore, the provision of the third optical element increases the number of optical surfaces in the observation optical system, which enables better correction of aberrations generated in the observation optical system.

Moreover, the first optical element includes an optical surface having a transmission function and a reflection function, which makes it possible to overlap partial areas of the enlarged images being combined, which are formed with the light from the first display element and the light from the second display element. Therefore, even when the observer's eye is rotated, the light from the first display element and the light from the second display element can enter a pupil of the observer's eye, which enables presentation of a natural enlarged combined image in which the joint line in the boundary part of the enlarged images being combined.

Further, in each of Embodiments 1 and 2, providing the light-amount reducing member on the optical path of the second light component being introduced to the exit pupil from the second display element without being transmitted through the first optical element makes the luminance of the second light component approximately equal to that of the first light component being transmitted through the first optical element.

Furthermore, the observation optical system of Embodiment 2 is featured in that the first and second optical elements are formed as a prism element having at least two reflective surfaces. And, on the optical path of the first light component that emerges from the second display element and then is introduced to the exit pupil through the first optical element, the first optical element is cemented to the third optical element. In other words, an air layer is prevented from being formed between the first optical element and the third optical element. This almost eliminates influence of refraction at surfaces of the first and third optical elements facing each other, which further reduces the discontinuity of the enlarged images formed by the first light component being transmitted through the first optical element and the second light component being not transmitted through the first optical element.

Cementing the two optical elements to each other to form them into one body reduces the number of constituent elements, which makes it easy to handle the optical element.

Moreover, satisfying the condition of $|\theta 1-\theta 2|>20°$ enables prevention of generation of the flare and the ghost.

And, the use of the above-described observation optical system enables achieving of a small and thin image display apparatus suitable for mounting on a head of the observer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, each of the embodiments described the case where the first light component from the first display area of the second display element is introduced to the exit pupil through the second optical element, the first optical element and the third optical element. However, the first light component from the first display area may be introduced to the exit pupil through only the second and first optical elements. In other words, it is not necessarily necessary that the first light component be transmitted though the third optical element.

In further other words, it is only necessary to introduce the first light component from the first display area to the exit pupil through the second optical element and at least the first optical element of the first and third optical elements.

Moreover, although each of the embodiments described the case where the lights from the two display elements are introduced to the exit pupil, lights from three or more display elements may be introduced to the exit pupil.

This application claims the benefit of Japanese Patent Application No. 2009-119690, filed on May 18, 2009, which is hereby incorporated by reference herein in its entirety.

What is claimed is:

1. An observation optical system configured to introduce light from a first display element configured to display a first original image and light from a second display element configured to display a second original image to an exit pupil to present an enlarged combined image of the first and second original images, the observation optical system comprising:
    a first optical element configured to allow the light from the first display element to enter thereinto;
    a second optical element configured to allow the light from the second display element to enter thereinto; and
    a third optical element,
    wherein the optical system is configured to introduce a first light component from a first display area in the second display element to the exit pupil through the second optical element and at least the first optical element of the first and third optical elements, and introduce a second light component from a second display area that is a different area from the first display area in the second display element to the exit pupil through the second and third optical elements, not through the first optical element.

2. An observation optical system according to claim 1, wherein the optical system is configured to introduce the first light component from the first display area to the exit pupil through the second, first and third optical elements.

3. An observation optical system according to claim 1, wherein a light-amount reducing member is disposed on an optical path from the second display area to the exit pupil.

4. An observation optical system according to claim 2, wherein the first optical element is cemented to the third optical element on an optical path from the first display area to the exit pupil.

5. An observation optical system according to claim 4, wherein the following condition is satisfied:

$$|\theta 1-\theta 2|>20°$$

where θ1 represents an incident angle of the light from the second display element on an entrance surface of the second optical element, and θ2 represents an emergent angle from the entrance surface of the light reflected by a cemented surface of the first and third optical elements.

6. An image display apparatus comprising:
   a first display element configured to display a first original image;
   a second display element configured to display a second original image; and
   an observation optical system configured to introduce light from the first display element and light from the second display element to an exit pupil to present an enlarged combined image of the first and second original images, wherein the optical system comprising:
   a first optical element configured to allow the light flux from the first display element to enter thereinto;
   a second optical element configured to allow the light from the second display element to enter thereinto; and
   a third optical element,
   wherein the optical system is configured to introduce a first light component from a first display area in the second display element to the exit pupil through the second optical element and at least the first optical element of the first and third optical elements, and introduce a second light component from a second display area that is a different area from the first display area in the second display element to the exit pupil through the second and third optical elements, not through the first optical element.

* * * * *